United States Patent
Terashita et al.

(10) Patent No.: US 11,949,154 B2
(45) Date of Patent: Apr. 2, 2024

(54) ANTENNA DEVICE FOR VEHICLE

(71) Applicant: YOKOWO CO., LTD., Tokyo (JP)

(72) Inventors: Noritaka Terashita, Tomioka (JP); Motohisa Ono, Tomioka (JP)

(73) Assignee: YOKOWO CO., LTD., Tokyo (JP)

( * ) Notice: Subject to any disclaimer, the term of this patent is extended or adjusted under 35 U.S.C. 154(b) by 89 days.

(21) Appl. No.: 16/961,265

(22) PCT Filed: Jan. 8, 2019

(86) PCT No.: PCT/JP2019/000207
§ 371 (c)(1),
(2) Date: Jul. 10, 2020

(87) PCT Pub. No.: WO2019/139000
PCT Pub. Date: Jul. 18, 2019

(65) Prior Publication Data
US 2021/0066794 A1    Mar. 4, 2021

(30) Foreign Application Priority Data

Jan. 12, 2018 (JP) ................................. 2018-003711

(51) Int. Cl.
*H01Q 1/32* (2006.01)
*H01Q 1/50* (2006.01)
*H01Q 7/00* (2006.01)

(52) U.S. Cl.
CPC ............. *H01Q 1/50* (2013.01); *H01Q 1/3275* (2013.01); *H01Q 7/00* (2013.01)

(58) Field of Classification Search
CPC .......... H01Q 1/50; H01Q 1/3275; H01Q 7/00; H01Q 21/28; H04B 1/18; H04B 1/40
See application file for complete search history.

(56) References Cited

U.S. PATENT DOCUMENTS 3,098,231 A * 7/1963 St Vrain ................. H03H 2/005
343/745
3,257,587 A * 6/1966 Krafft ....................... H03J 7/14
174/253

(Continued)

FOREIGN PATENT DOCUMENTS

JP    2-65496 A    3/1990
JP    9-148958 A   6/1997

(Continued)

OTHER PUBLICATIONS

International Search Report and Written Opinion dated Feb. 26, 2019 for PCT/JP2019/000207 filed on Jan. 8, 2019, 9 pages including English Translation of the International Search Report.

*Primary Examiner* — Hai V Tran
*Assistant Examiner* — Bamidele A Immanuel
(74) *Attorney, Agent, or Firm* — XSENSUS LLP

(57) ABSTRACT

An antenna device for vehicle includes: an antenna element; an external connection terminal; a connection detection resistor having one end being grounded and having another end being connected with the external connection terminal, the connection detection resistor being connected in parallel with the antenna element; and a protection circuit having a capacitor, the capacitor having one end being grounded and having another end being connected with the external connection terminal, the capacitor being connected in parallel with the connection detection resistor, the protection circuit conducting a surge current from the external connection terminal to a ground side.

9 Claims, 5 Drawing Sheets

(56) References Cited

U.S. PATENT DOCUMENTS

| | | | | |
|---|---|---|---|---|
| 3,968,411 A * | 7/1976 | Mueller | H01Q 1/50 | 361/119 |
| 4,228,544 A * | 10/1980 | Guyton | H03H 7/466 | 455/292 |
| 4,875,019 A * | 10/1989 | Monson | H03H 11/04 | 330/306 |
| 4,985,800 A * | 1/1991 | Feldman | H01Q 1/50 | 333/206 |
| 6,009,337 A * | 12/1999 | Vaisanen | H04B 1/38 | 455/298 |
| 6,072,435 A * | 6/2000 | Terashima | H01Q 1/1271 | 343/704 |
| 6,188,296 B1 * | 2/2001 | Nibe | H03B 5/1876 | 331/117 FE |
| 6,429,829 B1 * | 8/2002 | Hirai | H01Q 1/50 | 343/895 |
| 6,597,227 B1 * | 7/2003 | Yue | H01L 27/0248 | 361/91.1 |
| 7,990,665 B2 * | 8/2011 | Chang | H02H 9/042 | 361/56 |
| 2003/0194985 A1 * | 10/2003 | Nakamura | H03D 7/125 | 333/128 |
| 2005/0285684 A1 * | 12/2005 | Burgener | H03F 3/189 | 330/311 |
| 2006/0098374 A1 * | 5/2006 | Youn | G06K 19/0701 | 361/119 |
| 2006/0145859 A1 * | 7/2006 | Posamentier | G06K 7/0008 | 340/572.7 |
| 2007/0085754 A1 * | 4/2007 | Ella | H01Q 23/00 | 343/862 |
| 2007/0253177 A1 | 11/2007 | Nibe | | |
| 2008/0079513 A1 * | 4/2008 | Prikhodko | H03H 7/0115 | 333/32 |
| 2008/0079514 A1 * | 4/2008 | Prikhodko | H03H 7/38 | 333/32 |
| 2008/0291591 A1 * | 11/2008 | Huang | H01Q 1/50 | 361/56 |
| 2010/0090917 A1 * | 4/2010 | Roeckl | H04B 1/18 | 343/722 |
| 2010/0295752 A1 * | 11/2010 | Nibe | H01P 3/081 | 343/904 |
| 2010/0304693 A1 * | 12/2010 | Uejima | H04B 1/44 | 455/83 |
| 2011/0002080 A1 * | 1/2011 | Ranta | H03J 3/20 | 361/277 |
| 2011/0187622 A1 * | 8/2011 | Yukimoto | H01Q 1/48 | 343/848 |
| 2013/0021113 A1 * | 1/2013 | Bakalski | H04B 1/18 | 333/262 |
| 2013/0157595 A1 * | 6/2013 | Wan | H04B 1/3888 | 455/90.2 |
| 2013/0207739 A1 * | 8/2013 | Bakalski | H04B 1/18 | 333/33 |
| 2013/0344835 A1 * | 12/2013 | Bakalski | H03H 7/1758 | 455/307 |
| 2014/0021796 A1 * | 1/2014 | Song | H02J 50/12 | 307/104 |
| 2014/0104132 A1 * | 4/2014 | Bakalski | H01L 23/66 | 333/32 |
| 2014/0113571 A1 * | 4/2014 | Fujiwara | H03H 9/6433 | 455/73 |
| 2014/0162579 A1 * | 6/2014 | Han | H04B 1/0458 | 455/127.2 |
| 2014/0361856 A1 * | 12/2014 | Leipold | H03H 7/0153 | 333/24 C |
| 2015/0118984 A1 * | 4/2015 | Nagumo | H04B 1/18 | 455/193.1 |
| 2015/0212141 A1 * | 7/2015 | Maruyama | G01R 27/00 | 324/691 |
| 2015/0270608 A1 * | 9/2015 | Sub Shin | H01Q 1/243 | 343/722 |
| 2015/0318890 A1 * | 11/2015 | Uejima | H04B 1/0057 | 455/83 |
| 2016/0254799 A1 * | 9/2016 | Kim | H03B 5/244 | 327/559 |
| 2016/0269053 A1 * | 9/2016 | Lee | H04B 1/0458 | |
| 2017/0063411 A1 * | 3/2017 | Ripley | H04B 1/1036 | |
| 2017/0063412 A1 * | 3/2017 | Ripley | H04B 1/18 | |
| 2017/0063413 A1 * | 3/2017 | Ripley | H04B 1/18 | |
| 2017/0070261 A1 * | 3/2017 | Corum | H04B 3/52 | |
| 2017/0170564 A1 * | 6/2017 | Velandia Torres | H03H 7/38 | |
| 2017/0187368 A1 * | 6/2017 | Thomas | H03K 5/01 | |
| 2018/0159222 A1 * | 6/2018 | Backes | H03H 7/40 | |
| 2020/0015174 A1 * | 1/2020 | Larson | H04B 17/309 | |
| 2021/0194527 A1 * | 6/2021 | Nakayama | H04B 1/40 | |
| 2022/0038063 A1 * | 2/2022 | Chen | H03H 7/54 | |

FOREIGN PATENT DOCUMENTS

| | | | | |
|---|---|---|---|---|
| JP | 2003-087147 A | 3/2003 | | |
| JP | 2007-300159 A | 11/2007 | | |
| JP | 2013-004830 A | 1/2013 | | |
| TW | I399885 B * | 5/2007 | | H01Q 1/50 |
| TW | M502971 U * | 3/2015 | | H01Q 1/22 |
| WO | 2006/066176 A2 | 6/2006 | | |

* cited by examiner

ANTENNA DEVICE FOR VEHICLE

CROSS-REFERENCE TO RELATED APPLICATIONS

The present application is based on PCT filing PCT/JP2019/000207, filed Jan. 8, 2019, which claims priority to JP 2018-003711, filed Jan. 12, 2018, the entire contents of each are incorporated herein by reference.

TECHNICAL FIELD

The present invention relates to an antenna device for vehicle.

BACKGROUND ART

An antenna device for vehicle is used such that it is attached on a roof or the like of a vehicle and a signal cable drawn out to an exterior of the antenna device for vehicle is thereafter is connected with an on-vehicle electronic apparatus installed in the vehicle. Here, as a technique for detecting whether the signal cable of the antenna device for vehicle is normally connected with the on-vehicle electronic apparatus, a technique of an antenna device for vehicle has been known, the antenna device for vehicle in a configuration in which a predetermined current is generated in a connection detection resistor connected in parallel with an antenna elemental device when a direct current voltage for connection detection is applied from the on-vehicle electronic apparatus to the antenna device for vehicle (for example, Patent Literature 1).

PRIOR ART DOCUMENTS

Patent Literature

Patent Literature 1: JP-A-2003-87147

SUMMARY OF INVENTION

Problems to be Solved by the Invention

There have been cases where a surge voltage occurs when an antenna device for vehicle is connected with an on-vehicle electronic apparatus. There is a concern that an excessively high voltage is applied to a connection detection resistor due to this surge voltage and the connection detection resistor may be damaged.

A problem to be solved by the invention is to realize a measure against a surge voltage that may occur to an antenna device for vehicle.

Solution to the Problems

One aspect of the invention provides an antenna device for vehicle, the antenna device including: an antenna element; an external connection terminal; a connection detection resistor having one end being grounded and having another end being connected with the external connection terminal, the connection detection resistor being connected in parallel with the antenna element; and a protection circuit having a capacitor, the capacitor having one end being grounded and having another end being connected with the external connection terminal, the capacitor being connected in parallel with the connection detection resistor, the protection circuit conducting a surge current from the external connection terminal to a ground side.

In the above-referenced aspect, because the capacitor mounted on the protection circuit conducts the surge current to the ground side when a surge voltage is applied to the external connection terminal, a high surge voltage is prevented from being applied to the connection detection resistor. Thus, as a measure against the surge voltage, the connection detection resistor may be protected. Further, because the capacitor is connected with the external connection terminal in parallel with the connection detection resistor, a connection detection function by the connection detection resistor is not impaired.

In the antenna device for vehicle, the protection circuit may have a coil that is connected with the capacitor in series.

Accordingly, the coil connected with the capacitor in series prevents an RF signal obtained by the antenna element from being attenuated by the capacitor. When the surge voltage is applied to the external connection terminal, the surge current is conducted to the ground side by the capacitor.

In accordance with one of some embodiments, there is provided the antenna device for vehicle, wherein
  the coil may be mounted between the capacitor and the external connection terminal.

Accordingly, the antenna device may be configured such that the protection circuit in which the coil and the capacitor are connected together in series is connected with the external connection terminal.

In accordance with one of some embodiments, there is provided the antenna device for vehicle, wherein
  the other end of the connection detection resistor may be connected between the capacitor and the coil.

Accordingly, because the coil is mounted between the external connection terminal and the connection detection resistor but the coil enables a direct current component of a signal for connection detection to pass, the connection detection function by the connection detection resistor is not impaired.

In accordance with one of some embodiments, there is provided the antenna device for vehicle, wherein
  the other end of the connection detection resistor may be connected between the coil and the external connection terminal.

Accordingly, the antenna device may be configured such that the protection circuit is connected in parallel with the connection detection resistor.

In accordance with one of some embodiments, there is provided the antenna device for vehicle, wherein
  the capacitor may have a first capacitor and a second capacitor that have different capacitances from each other, and
  the first capacitor and the second capacitor may be connected together in parallel.

Accordingly, the first capacitor and the second capacitor have different capacitances from each other and thus have different self-resonance frequencies from each other. Accordingly, compared to a case where only a single capacitor is present, the frequency band related to the surge current that may be conducted or the surge voltage may be widened.

In accordance with one of some embodiments, there is provided the antenna device for vehicle, may further comprise
  a direct current cutting capacitor between the antenna element and the external connection terminal, wherein the other end of the connection detection resistor and the other end of the capacitor are connected between the direct current cutting capacitor and the external connection terminal.

Accordingly, the direct current cutting capacitor may prevent the direct current component of a voltage for connection detection applied to the external connection terminal from flowing to the antenna element side and may enable the direct current component to flow to the connection detection resistor side.

In accordance with one of some embodiments, there is provided the antenna device for vehicle may further comprise another system with another antenna element, the other system being different from a system from the antenna element to the external connection terminal.

The antenna element radiates a radio wave based on a signal input from the external connection terminal. In a case where the input signal contains noise, a noise component may be included in the radio wave radiated from the antenna element. In this case, in a case where the antenna device further includes the other system with the other antenna element, the noise component included in the radio wave may adversely influence the other system. However, in the above-referenced aspect, in a case where the signal input from the external connection terminal contains noise, the noise component included in the signal input from the external connection terminal may be conducted to the ground side by the protection circuit to some extent. Consequently, it becomes possible to reduce the adverse influence on the other system.

DESCRIPTION OF EMBODIMENTS

Figure 1:
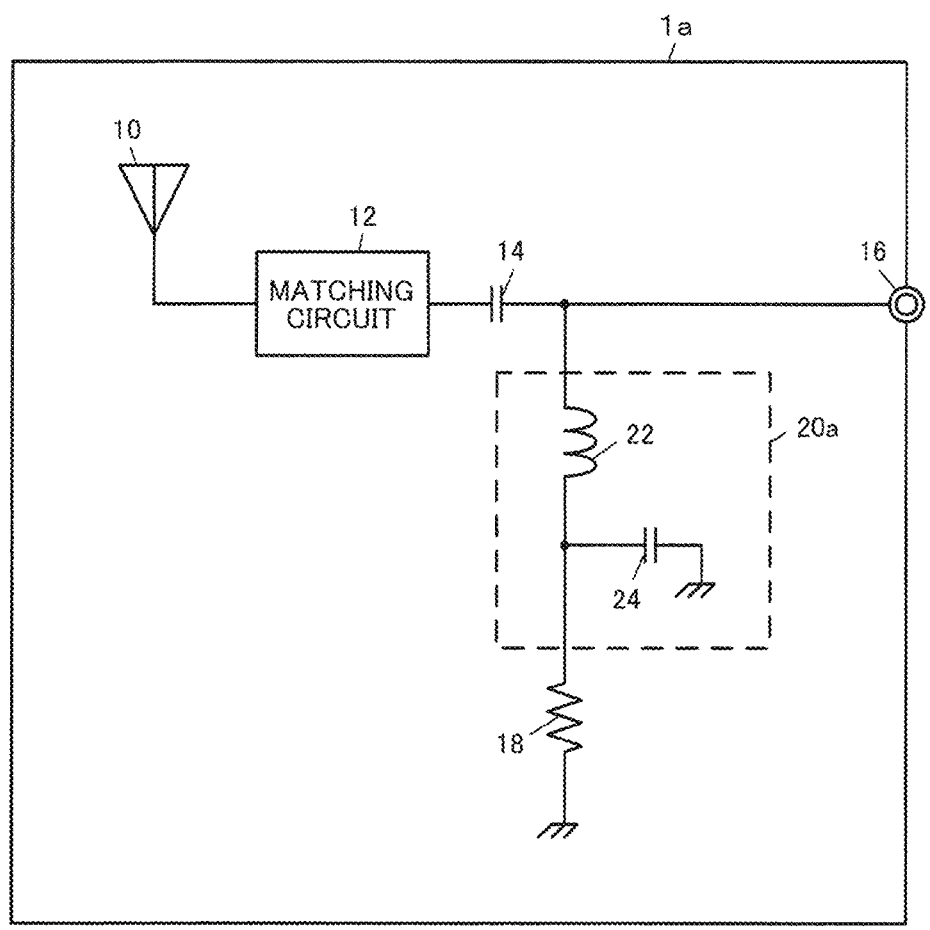
FIG. 1 is a configuration diagram of an antenna device of a first embodiment.

Preferable embodiments of the invention will hereinafter be described with reference to drawings. The invention is not limited by the embodiments described in the following, and forms to which the invention is applicable are not limited by the following embodiments either. Further, as for denotation in the drawings, the same reference characters will be given to the same elements.

First Embodiment

FIG. 1 is a configuration diagram of an antenna device of a first embodiment and is a diagram that schematically illustrates a circuit configuration of an antenna device 1a in the first embodiment. The antenna device 1a of this embodiment is an antenna device for vehicle that is mounted on a roof of a vehicle such as a passenger vehicle, a truck, or an agricultural machine and is configured such that each part such as an antenna element is housed in an antenna case formed of a synthetic resin having transparency of radio wave such as polycarbonate (PC) or polyethyleneterephthalate (PET), for example. As illustrated in FIG. 1, the antenna device 1a has a telephone (TEL) element 10 as an antenna element, a matching circuit 12, a direct current cutting capacitor 14, an external connecting terminal 16, a protection circuit 20a, and a connection detection resistor 18.

The TEL element 10 is connected with the external connection terminal 16 via the matching circuit 12 and the direct current cutting capacitor 14. The external connection terminal 16 is connected with an on-vehicle electronic apparatus installed in the vehicle such as a telematics control unit (TCU). In a case where the telecommunications standard of a cellular phone is Long-Term Evolution (LTE), the TEL element 10 is also referred to as LTE element.

The connection detection resistor 18 is a resistor for detecting whether the antenna device 1a is normally connected with the TCU. One end of the connection detection resistor 18 is grounded, the other end is connected with the external connection terminal 16 via the protection circuit 20a, and the connection detection resistor 18 is thereby connected the external connection terminal 16 in parallel with the TEL element 10. Connection detection of the antenna device 1a with respect to the TCU by using the connection detection resistor 18 is carried out by causing the TCU to apply a direct current voltage as a connection detection signal from the external connection terminal 16 to the antenna device 1a and by determining whether or not the TCU may detect a predetermined direct current or direct current voltage that is generated if the antenna device 1a is normally connected with the TCU. Here, the predetermined direct current denotes a direct current that is generated in the connection detection resistor 18 by external application of a connection detection voltage to the external connection terminal 16. Further, the predetermined direct current voltage denotes a voltage based on a detection voltage circuit on the TCU side.

The direct current cutting capacitor 14 is mounted between the TEL element 10 and the external connection terminal 16 and hinders inflow of a direct current to the TEL element 10 as the antenna element. In this embodiment, because the configuration includes the matching circuit 12, the direct current cutting capacitor 14 is mounted between the matching circuit 12 and the external connection terminal 16. Further, the other end of the connection detection resistor 18 is connected between the direct current cutting capacitor 14 and the external connection terminal 16. Thus, the direct current cutting capacitor 14 prevents a direct current voltage for connection detection from flowing into the matching circuit 12 side.

The protection circuit 20a has a coil 22 and a capacitor 24 that are connected together in series. Further, the other end of the connection detection resistor 18 is connected between the capacitor 24 and the coil 22. The coil 22 is mounted between the capacitor 24 and the external connection terminal 16. The coil 22 may be a coil that exhibits self-resonance in a communication frequency band of the TEL element 10. One end of the capacitor 24 is grounded, the other end is connected with the external connection terminal 16 via the coil 22, and the capacitor 24 is thereby connected with the external connection terminal 16 in parallel with the connection detection resistor 18. Because the direct current for the connection detection passes through the coil 22, a connection detection function is not impaired due to provision of the protection circuit 20a. Because the other end of the capacitor 24 is connected with the external connection terminal 16 via the coil 22, an RF signal obtained by the TEL element 10 may be prevented from being attenuated by the capacitor 24.

A surge voltage may occur due to electric charge on the on-vehicle electronic apparatus connected with the external connection terminal 16 via a communication cable, touch on the external connection terminal 16 by a person, or the like. In a case where the surge voltage occurs, a surge current is released to a ground (ground side) via the capacitor 24 of the protection circuit 20a. In such a manner, the protection circuit 20a is mounted, and the surge voltage may thereby be prevented from being applied to the connection detection resistor 18. That is, because the surge current is not applied to the connection detection resistor 18, the connection detection resistor 18 is protected. Because it may be considered that conduction of the surge current to the ground (ground side) is made by the capacitor 24, as a measure against the surge voltage, the connection detection resistor 18 may be protected by providing the capacitor 24.

Figure 2:
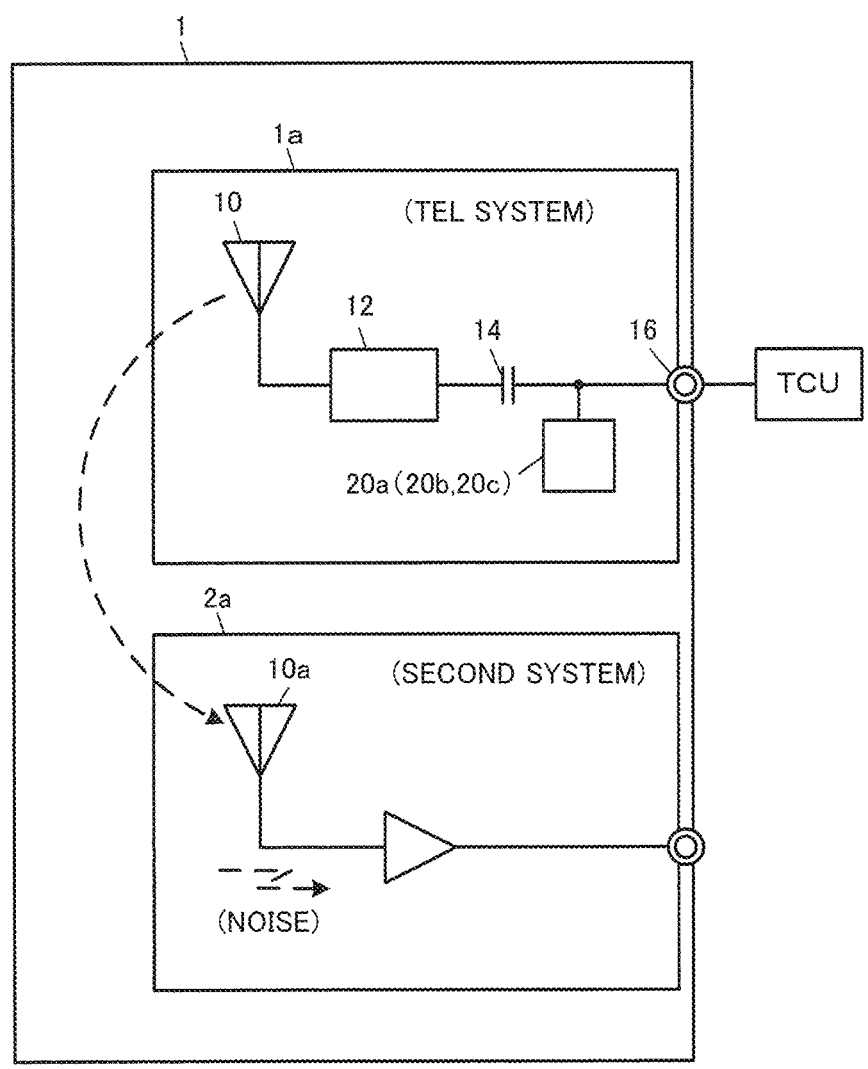
FIG. 2 is an explanatory diagram of a case where the antenna device includes two antenna systems.

Further, the protection circuits 20a provides other actions and effects. Size reduction of the antenna device mounted on the roof of the vehicle is demanded, and multi-functionality is demanded as well. Thus, for example, a configuration that includes plural antenna systems (or communication systems) is present. FIG. 2 is an explanatory diagram of a case where the antenna device includes two antenna systems. As illustrated in FIG. 2, a configuration is made such that plural circuit systems are arranged in one antenna device 1. In the example of FIG. 2, the antenna device 1 is configured to include a second system 2a in addition to a TEL system included in the above-referenced antenna device 1a. The second system 2a is a system for radio reception or the like, for example. However, FIG. 2 does not illustrate the connection detection resistor 18.

Here, a case on the assumption that no protection circuit 20a is present in the TEL system becomes as follows. The TEL element 10 of the TEL system radiates a radio wave based on a signal input from the external connection terminal 16. In a case where the signal input from the external connection terminal 16 contains noise, a noise component may be included in the radio wave radiated from the TEL element 10. In this case, there is a possibility that an antenna element 10a of the second system 2a receives an influence of the radio wave including the noise component and an adverse influence occurs to the second system 2a.

However, the protection circuit 20a enables the noise component included in the signal input from the external connection terminal 16 to flow to a ground (ground side) to some extent. Thus, it becomes possible to reduce the adverse influence on the second system 2a.

Figure 3A:
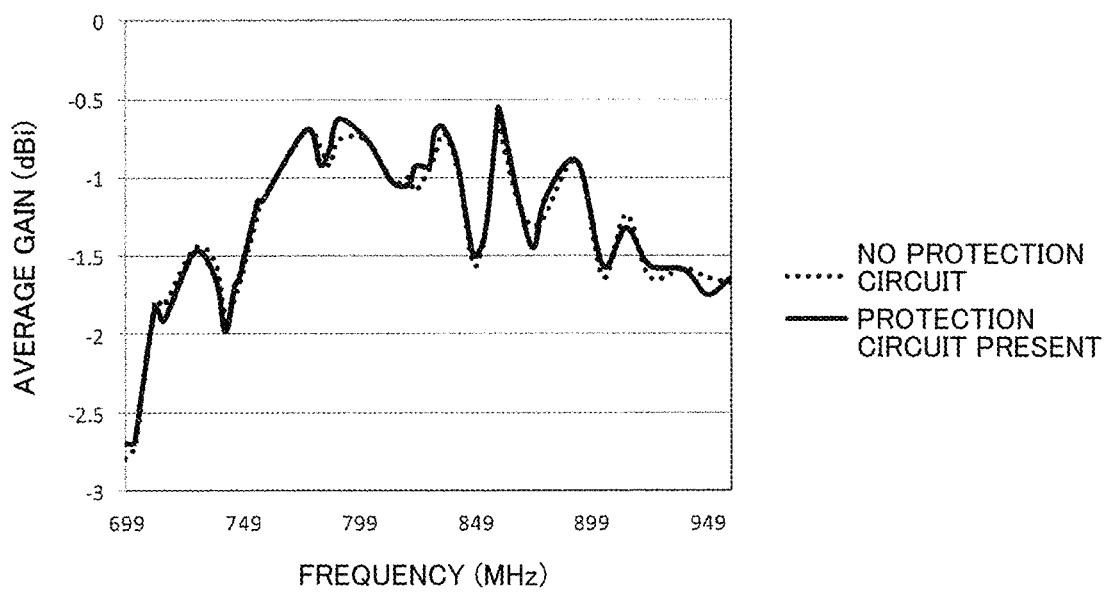
FIG. 3A illustrates experiment results about the antenna device of the first embodiment and is a graph that represents a horizontal plane average gain from 699 MHz to 960 MHz.
Figure 3B:
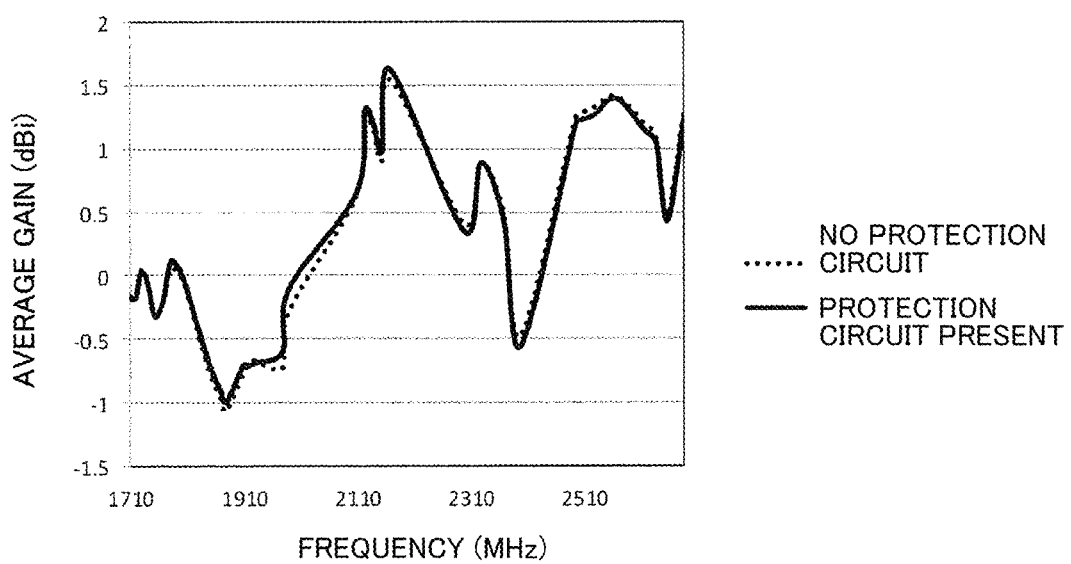
FIG. 3B illustrates experiment results about the antenna device of the first embodiment and is a graph that represents the horizontal plane average gain from 1,710 MHz to 2,690 MHz.

Next, a description will be made about experiment results about the antenna device 1a of this embodiment. FIG. 3A is a graph that represents the horizontal plane average gain from 699 MHz to 960 MHz as one of communication frequency bands of the TEL element 10, and FIG. 3B is a graph that represents the horizontal plane average gain from 1,710 MHz to 2,690 MHz as one of the communication frequency bands of the TEL element 10. Both of FIG. 3A and FIG. 3B represent cases where the protection circuit 20a is provided by solid line curves and cases where no protection circuit 20a is provided by dotted line curves. In the communication frequency bands of the TEL element 10, the horizontal plane average gains are hardly different regardless of presence or absence of the protection circuit 20a.

Consequently, communication performance of the antenna device 1a is not impaired due to provision of the protection circuit 20a.

In such a manner, in this embodiment, even if the surge voltage occurs to the external connection terminal 16 in the antenna device 1a for vehicle, the surge current is conducted to the ground side by the protection circuit 20a. Thus, the surge voltage is prevented from being applied to the connection detection resistor 18, and the connection detection resistor 18 may thereby be protected.

Second Embodiment

Next, a second embodiment will be described. The second embodiment is a form that includes a protection circuit 20b having plural capacitors connected together in parallel instead of the capacitor 24 of the protection circuit 20a in the first embodiment. In the following, the same reference characters are given to the same configuration elements as the first embodiment, and detailed descriptions thereof will not be repeated or will be simplified.

Figure 4:
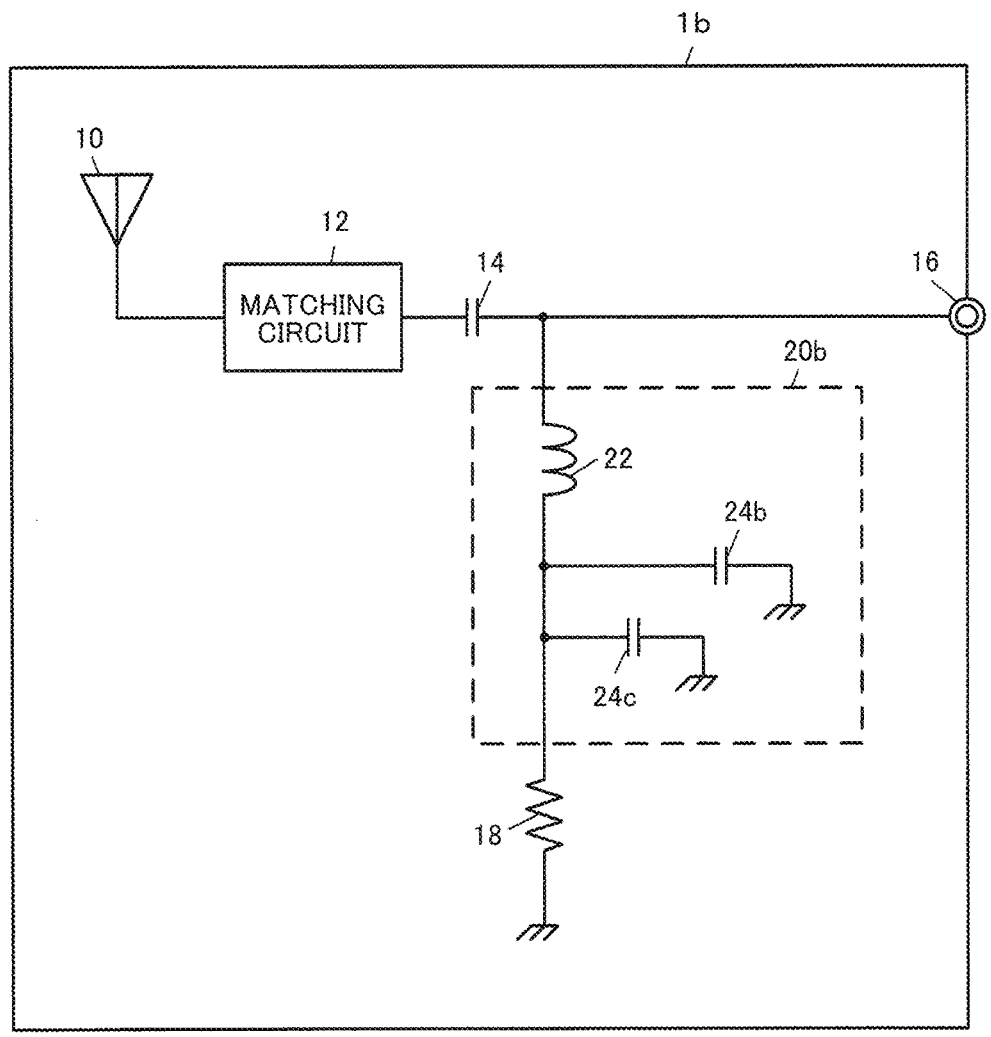
FIG. 4 is a configuration diagram of an antenna device of a second embodiment.

FIG. 4 is a configuration diagram of an antenna device 1b of the second embodiment. As illustrated in FIG. 4, the protection circuit 20b of the antenna device 1b in the second embodiment has the coil 22 and two capacitors 24b and 24c that are connected together in parallel. One end of each of the capacitors 24b and 24c is grounded, and the other end is connected with the coil 22. Further, the capacitors 24b and 24c have different capacitances from each other. The number of capacitors is not limited to two, but a configuration may be made such that three or more capacitors with different capacitances may be connected together in parallel.

In a similar manner to the first embodiment, also in the antenna device 1b of the second embodiment, even if the surge voltage occurs to the external connection terminal 16, the surge current is conducted to the ground side by the protection circuit 20b. Thus, the surge voltage is prevented from being applied to the connection detection resistor 18, and the connection detection resistor 18 may thereby be protected. In addition, as a feature of the second embodiment, the capacitors 24b and 24c have different capacitances from each other and thus have different self-resonance frequencies from each other. Accordingly, the frequencies of signals that may be conducted to the ground (ground side) by the protection circuit 20b may be widened compared to the first embodiment.

For example, the antenna device 1 illustrated in FIG. 2 is configured to include the protection circuit 20b instead of the protection circuit 20a of the TEL system. In this case, the frequency band that may be caused to flow to the ground (ground side) in the noise component included in the signal input from the external connection terminal 16 may be widened compared to a case of the protection circuit 20a. Accordingly, it becomes possible to increase the extent of reduction in the adverse influence on the second system 2a compared to the case of the protection circuit 20a and to enhance effects.

Third Embodiment

Next, a third embodiment will be described. The third embodiment is a form in which a protection circuit is connected in parallel with a connection detection resistor. In the following, the same reference characters are given to the same configuration elements as the above-referenced first embodiment and second embodiment, and detailed descriptions thereof will not be repeated or will be simplified.

Figure 5:
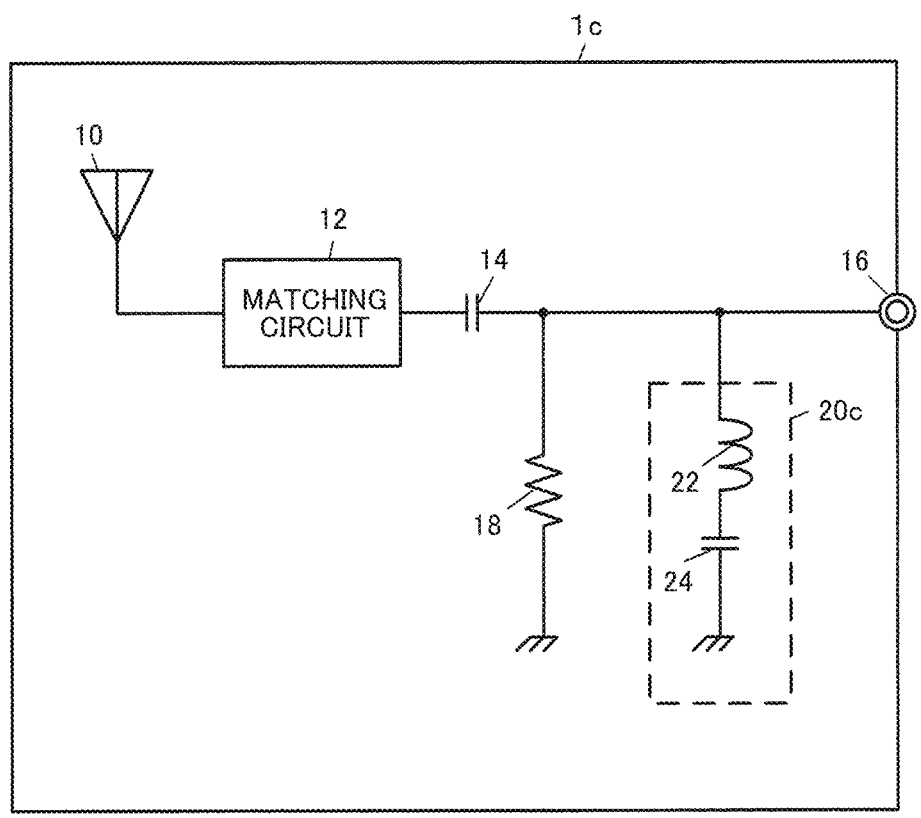
FIG. 5 is a configuration diagram of an antenna device of a third embodiment.

FIG. 5 is a configuration diagram of an antenna device 1c of the third embodiment. As illustrated in FIG. 5, the antenna device 1c in the third embodiment has a protection circuit 20c that is connected in parallel with the connection detection resistor 18. The protection circuit 20c has the coil 22 and the capacitor 24 that are connected together in series. The coil 22 is mounted between the capacitor 24 and the external connection terminal 16, and the other end of the connection detection resistor 18 is connected between the coil 22 and the external connection terminal 16.

In a similar manner to the first embodiment, also in the antenna device 1c of the third embodiment, even if the surge voltage occurs to the external connection terminal 16, the surge current is conducted to the ground side by the protection circuit 20c. Thus, the surge voltage is prevented from being applied to the connection detection resistor 18, and the connection detection resistor 18 may thereby be protected.

Further, the antenna device 1 illustrated in FIG. 2 is configured to include the protection circuit 20c instead of the protection circuit 20a of the TEL system. In this case, as a feature of the third embodiment, because the protection circuit 20c in which the coil 22 and the capacitor 24 are connected together in series is connected in parallel with the connection detection resistor 18, the protection circuit 20c may cause the surge current to flow to the ground (ground side) in a similar manner.

The protection circuit 20c of the third embodiment may be configured such that plural capacitors with different capacitances may be connected together in parallel instead of the capacitor 24.

MODIFICATION EXAMPLES

It is matter of course that embodiments to which the invention is applicable are not limited to the above-referenced embodiments and appropriate alterations are possible without departing from the scope of the gist of the invention. For example, the embodiments are described as the antenna devices for vehicle; however, it is possible to apply those for purposes of use such as watercrafts other than vehicles.

EXPLANATION OF REFERENCES 1, 1a, 1b, 1c antenna device
10 TEL element
12 matching circuit
14 direct current cutting capacitor
16 external connection terminal
18 connection detection resistor
20a, 20b, 20c protection circuit
22 coil
24, 24a, 24b capacitor

The invention claimed is:

1. An antenna device for vehicle, the antenna device comprising:
an antenna element;
an external connection terminal being connected with an external device;
a connection detection resistor having one end being grounded and having another end being connected with the external connection terminal, the connection detection resistor being connected in parallel with the antenna element;
a protection circuit having a capacitor, the capacitor having one end being grounded and having another end being connected with the external connection terminal, the capacitor being connected in parallel with the connection detection resistor, the protection circuit conducting a surge current from the external connection terminal to a ground side;
a matching circuit; and
a direct current cutting capacitor having one end being connected with the matching circuit and having another end being connected with the external connection terminal,
wherein the connection detection resistor is a resistor for detecting whether the external device is normally connected with the external connection terminal by a direct current voltage applied to the external connection terminal,
wherein the protection circuit is configured to conduct the surge current to the ground side, the surge current that occurs due to applying a surge voltage other than the direct current voltage to the external connection terminal, and
wherein the other end of the connection detection resistor and the other end of the capacitor are connected between the direct current cutting capacitor and the external connection terminal.

2. The antenna device for vehicle according to claim 1, wherein the protection circuit has a coil that is connected with the capacitor in series.

3. The antenna device for vehicle according to claim 2, wherein the coil is mounted between the capacitor and the external connection terminal.

4. The antenna device for vehicle according to claim 3, wherein the other end of the connection detection resistor is connected between the capacitor and the coil.

5. The antenna device for vehicle according to claim 3, wherein the other end of the connection detection resistor is connected between the coil and the external connection terminal.

6. The antenna device for vehicle according to claim 5, wherein the capacitor has a first capacitor and a second capacitor that have different capacitances from each other, and the first capacitor and the second capacitor are connected together in parallel.

7. The antenna device for vehicle according to claim 4, wherein the capacitor has a first capacitor and a second capacitor that have different capacitances from each other, and the first capacitor and the second capacitor are connected together in parallel.

8. The antenna device for vehicle according to claim 1, wherein the capacitor has a first capacitor and a second capacitor that have different capacitances from each other, and the first capacitor and the second capacitor are connected together in parallel.

9. The antenna device for vehicle according to claim 1, further comprising another system with another antenna element, the other system being different from a system from the antenna element to the external connection terminal.

* * * * *